Patented Dec. 1, 1942

2,303,549

UNITED STATES PATENT OFFICE 2,303,549

METHOD FOR MAKING BROMO-CHLOR-ALKANES

Amos G. Horney, East Cleveland, Ohio, assignor, by mesne assignments, to Air Reduction Company, Incorporated, a corporation of New York No Drawing. Application April 24, 1939,
Serial No. 269,793

6 Claims. (Cl. 260—658)

This invention relates to the synthesis of hydrocarbon compounds having the general formula of $C_nH_{2n}$ and relates more particularly to a new and improved process for making cyclohydrocarbons.

The present invention makes possible the production of hydrocarbons of the general formula, just stated, i. e., olefins and cyclic compounds, from non-cyclic, substituted hydrocarbons by a new and improved process. Briefly stated, this process includes the steps of providing a suitable substituted alkane containing three or more carbon atoms and two different halogens selected from the group consisting of chlorine, bromine and iodine and then treating such a substituted alkane with zinc dust in suspension in a liquid medium, which is preferably predominantly aqueous, in a manner to produce olefins or cyclohydrocarbons of the general formula $C_nH_{2n}$.

The present invention will first be described with specific reference to the production of cyclopropane.

The production of a substituted alkane suitable for the present purpose may be accomplished by any one of several different methods.

One such method is as follows: Hydrogen bromide is passed into a halogen substituted alkene, such as allyl chloride, in the presence of a suitable catalyst such as paraldehyde, or while exposed to light, such as sunlight or ultra-violet light. The resulting product will contain 1-bromo-3-chloropropane and 2-bromo-1-chloropropane, according to the following reaction:

$$CH_2Cl-CH=CH_2+HBr \rightarrow CH_2Cl-CH_2-CH_2Br$$

and $$CH_2Cl-CHBr-CH_3$$

The product of the foregoing reaction may be washed with water and neutralized with an alkali, such as sodium carbonate, dried and then distilled. Since the 2-bromo-1-cholropropane boils at about 118° C., it may be separated readily from the 1-bromo-3-chloropropane which has a boiling point of about 142° C. and each of these substances may thus be obtained with relatively high degrees of purity. The 1-bromo-3-chloropropane, $CH_2-Cl-CH_2-CH_2Br$, is a substituted alkane which may be treated according to the second above mentioned step of this invention for conversion into cyclopropane. The 2-bromo-1-chloropropane, $CH_2Cl-CHBr-CH_3$, is a substituted alkane which may be treated by the second above mentioned step of the present invention for conversion into propene.

Another method for making a suitable substituted alkane is as follows:—Normal propyl alcohol is treated with HBr or NaBr and $H_2SO_4$ to yield normal propyl bromide according to the following reaction:

$$CH_3-CH_2-CH_2OH+HBr \xrightarrow{H_2SO_4} CH_3-CH_2-CH_2Br+H_2O$$

This reaction product may be washed with water and dilute alkali, dried and then purified by distillation to separate out the normal propyl bromide. Treatment of this compound with chlorine gas at a pressure of about one or more atmospheres and at a temperature of between about 25° C. and 180° C. will yield a high percentage of 1-bromo-3-chloropropane and limited amounts of 1-bromo-2-chloropropane. Such substances may be separated and purified as above-described in the first example and then treated separately according to the second above mentioned step of the present invention to produce respectively cyclopropane and propene.

Having provided a suitable substituted alkane, by the foregoing or equivalent methods, such a substituted alkane is then treated according to the second above mentioned step. When cyclopropane is the product desired, 1-bromo-3-chloropropane is treated by being introduced slowly, as by dripping it, into a liquid medium, which is preferably predominatingly water and which contains zinc dust in suspension. This reaction mixture should be maintained at a temperature of between about 70° C. and the boiling temperature of the reaction mixture which, in case substantially pure water is used, is 100° C. Since the reaction proceeds with greater rapidity at the higher temperatures, it is preferable to maintain the reaction mixture at between about 90° C. and about 98° C.

The rate of the reaction may be increased somewhat by raising the boiling point of the liquid medium as may be done by adding salts thereto or increasing the pressure.

The liquid medium may consist of water containing as much as about 20% of ethyl alcohol. Other water-soluble, low-molecular-weight, organic compounds such as alcohols, ketones and esters may be used with water, but none of these substances is necessary or desirable for they tend to retard the rate of the reaction by lowering the boiling point.

The gases generated by the reaction are passed thru a condenser which condenses any water vapor but permits the gaseous cyclopropane to pass therethru. This gas has a boiling point of about —32° C. After passing thru the condenser, this gas is collected and purified, if necessary, by any suitable means, for example, by liquefying, distilling and scrubbing with dilute potassium permanganate.

The residue remaining after the cyclopropane has been generated contains zinc-chloridebromide, ZnClBr, which may be recovered and used, for example, in preparing normal propyl bromide from propyl alcohol by substituting this zinc-chloridebromide for the HBr or NaBr in the reaction hereinabove described for treating propyl alcohol.

When propene is the product desired, the 1-bromo-2-chloropropane above mentioned is treated with a liquid medium containing zinc dust in the manner above described in connection with the treatment of the 1-bromo-3-chloropropane and the propene gas is collected as generated.

The foregoing description of the invention has been restricted to the preparation of cyclopropane and propene for reasons of clarity and definiteness. It will be understood, however, by those skilled in the art, that the present invention may be practiced with any mixed halogen substituted alkane containing from three to ten carbon atoms. For example, mixed halogen substituted alkanes containing as many as eight or ten carbon atoms may be treated according to the present invention to prepare cyclohydrocarbons or alkyl substituted cyclohydrocarbons and olefins containing corresponding numbers of carbon atoms.

It is important that the alkanes subjected to treatment by this invention should contain two different halogens selected from the group consisting of chlorine, bromine and iodine. While iodine may be used, it is preferable, for economic reasons, to use alkanes containing chlorine and bromine.

Prior to this invention difficulty has been experienced in controlling the amounts of 1-bromo-3-chloropropane and 2-bromo-1-chloropropane from the treatment of allyl chloride with hydrogen bromide, i. e., the reaction was apparently not well enough understood so that a high percentage of one compound or the other could be forecast with assurance.

I have discovered that high yields of 1-bromo-3-chloropropane can be made with certainty and assurance by treating allyl chloride with hydrogen bromide in the absence of substances which inhibit the reaction or, if such substances are present, by minimizing or overcoming their inhibiting effect by the presence of small amounts of suitable catalysts or anti-inhibitors. Freshly distilled allyl chloride does not ordinarily contain any inhibitors and is "suitable" for this reaction. Allyl chloride which has been stored for some time in containers which do not include inhibitors, such as glass, earthenware or quartz containers, is also "suitable" for this reaction.

It is difficult to construct equipment, for carrying out the foregoing reaction on a commercial scale, entirely from materials which are not inhibitors of the allyl chloride hydrogen bromide reaction. Materials such as glass, earthenware and quartz are not inhibitors but it is difficult to construct commercial equipment composed entirely of these materials. Equipment parts which would normally be used, for example, parts composed of inhibitors such as iron, Pioneer alloy, glass fiber with Bakelite binding, Hastelloy B and the like may be used to a limited extent and preferably where they do not come into contact with the liquid. Their inhibiting effects can be overcome by the presence of a suitable catalyst. Suitable catalysts are simple aldehydes such as paraldehyde, propionaldehyde, paraformaldehyde, benzaldehyde and nitrobenzaldehyde and a ketone such as acetone.

This reaction may be carried out under pressure as high as about 100 lbs. per sq. inch and as low as about atmospheric. Where the reaction is carried out under the higher pressure and small amounts of the foregoing inhibitors are present their inhibiting effect in the presence of any of the foregoing catalysts is substantially overcome but when the reaction is carried out at about atmospheric pressure the catalysts are not as effective.

I have found that when the allyl chloride hydrogen bromide reaction is carried out in the presence of paraldehyde high yields of 1-bromo-3-chloropropane are obtained even when antioxidants such as hydroquinone, thio-cresol and acetic acid are present.

The temperature range within which hydrogen bromide will react with allyl chloride to produce good yields of 1-bromo-3-chloropropane is rather wide. For example, the reaction takes place at as low a temperature as about $-60°$ C. and proceeds quite rapidly at temperatures between $+7°$ C. and $+35°$ C., and when the reaction temperature is between the latter two temperatures and the allyl chloride has been freshly distilled and a suitable catalyst is present in small quantities, yields of as much as 85% of 1-bromo-3-chloropropane have been obtained consistently.

This application is a continuation-in-part of my co-pending application Serial No. 200,802 filed April 7, 1938, now Patent No. 2,219,260, issued October 22, 1940.

Having thus described the present invention so that those skilled in the art may be able to understand and practice the same, I state that what I desire to secure by Letters Patent is defined in what is claimed.

What is claimed is:

1. The method of making bromo-chlor-alkanes which includes the steps of treating a substituted alkene containing three or more carbon atoms and chlorine with hydrogen bromide in the presence of a catalyst selected from the group consisting of paraldehyde, propionaldehyde, paraformaldehyde, benzaldehyde, nitrobenzaldehyde.

2. The method of making bromo-chlor-alkanes which includes the steps of reacting allyl chloride with hydrogen bromide in the presence of a catalyst selected from the group consisting of paraldehyde, propionaldehyde, paraformaldehyde, benzaldehyde, nitrobenzaldehyde and separating the resulting 1-bromo-3-chloropropane from other products of the reaction.

3. The method of making bromo-chlor-alkanes which includes the steps of reacting allyl chloride with hydrogen, bromide in the presence of a simple aldehyde and separating the resulting 1-bromo-3-chloropropane from other products of the reaction.

4. The method of making bromo-chlor-alkanes which includes the steps of reacting allyl chloride with hydrogen bromide in the presence of a catalyst selected from the group consisting of paraldehyde, propionaldehyde, paraformaldehyde, benzaldehyde, nitrobenzaldehyde and at a temperature between about $-60°$ C. and about $+35°$ C. and separating the resulting 1-bromo-3-chloropropane from other products of the reaction.

5. The method of making bromo-chlor-alkanes which includes the steps of reacting allyl chloride with hydrogen bromide in the presence of a catalyst selected from the group consisting of paraldehyde, propionaldehyde, paraformaldehyde, benzaldehyde, nitrobenzaldehyde and under a pressure ranging from about atmospheric pressure to about 100 pounds per square inch and separating the resulting 1-bromo-3-chloropropane from the other products formed by such reaction.

6. The method of making 1-bromo-3-chloropropane which includes the steps of reacting allyl chloride with hydrogen bromide at a temperature between about —60° C. and about +35° C., at a pressure between about 100 lbs. per sq. inch and about atmospheric, and in the presence of a catalyst selected from the group consisting of paraldehyde, propionaldehyde, paraformaldehyde, benzaldehyde, nitrobenzaldehyde and recovering the resulting 1-bromo-3-chloropropane.

AMOS G. HORNEY.